| (12) | United States Patent | (10) Patent No.: | US 9,673,479 B2 |
|---|---|---|---|
| | Michelitsch et al. | (45) Date of Patent: | Jun. 6, 2017 |

(54) ENERGY ACCUMULATOR MODULE

(71) Applicant: SAMSUNG SDI CO., LTD., Yongin-si, Gyeonggi-do (KR)

(72) Inventors: Martin Michelitsch, Graz (AT); Ralph Wünsche, Graz (AT); Uwe Geidl, Graz (AT); Dietmar Niederl, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 120 days.

(21) Appl. No.: 14/276,441

(22) Filed: May 13, 2014

(65) Prior Publication Data

US 2014/0248527 A1   Sep. 4, 2014
US 2016/0133986 A9   May 12, 2016

Related U.S. Application Data

(62) Division of application No. 13/121,664, filed as application No. PCT/EP2009/062720 on Sep. 30, 2009, now abandoned.

(Continued)

(51) Int. Cl.

| H01M 2/00 | (2006.01) |
| H01M 10/04 | (2006.01) |
| H01M 2/10 | (2006.01) |
| H01M 10/625 | (2014.01) |
| H01M 10/6568 | (2014.01) |
| H01M 10/6555 | (2014.01) |

(Continued)

(52) U.S. Cl.
CPC ..... *H01M 10/0468* (2013.01); *H01M 2/1077* (2013.01); *H01M 2/1083* (2013.01); *H01M 2/206* (2013.01); *H01M 10/0481* (2013.01); *H01M 10/613* (2015.04); *H01M 10/625* (2015.04); *H01M 10/6554* (2015.04); *H01M 10/6555* (2015.04); *H01M 10/6556* (2015.04); *H01M 10/6568* (2015.04)

(58) Field of Classification Search
CPC ...................................................... H01M 2/00
See application file for complete search history.

(56) References Cited

U.S. PATENT DOCUMENTS

| 5,585,204 A | 12/1996 | Oshida et al. |
| 6,099,986 A | 8/2000 | Gauthier et al. |
| (Continued) | | |

FOREIGN PATENT DOCUMENTS

| AT | 9790 U1 | 3/2008 |
| CN | 1319916 A | 10/2001 |
| (Continued) | | |

OTHER PUBLICATIONS

Abstract and English Machine Translation of JP 2001-60466 A, dated Mar. 6, 2001, listed above, 6 pages.

(Continued)

*Primary Examiner* — Jacob Marks
(74) *Attorney, Agent, or Firm* — Lewis Roca Rothgerber Christie LLP

(57) ABSTRACT

An energy storage module having a plurality of stacked flat cells. The energy storage module has an interconnection formed in such a way that the energy storage module can be connected mechanically, electrically and/or for exchanging coolant with at least one other energy storage module of the same kind.

11 Claims, 17 Drawing Sheets

Related U.S. Application Data

(60) Provisional application No. 61/101,507, filed on Sep. 30, 2008.

(51) Int. Cl.
| | | |
|---|---|---|
| *H01M 10/6554* | (2014.01) | |
| *H01M 10/613* | (2014.01) | |
| *H01M 10/6556* | (2014.01) | |
| *H01M 2/20* | (2006.01) | |

(56) References Cited

U.S. PATENT DOCUMENTS

| | | | |
|---|---|---|---|
| 6,548,206 | B1 | 4/2003 | Gauthier et al. |
| 6,953,638 | B2 | 10/2005 | Inui et al. |
| 7,648,538 | B2 | 1/2010 | Oogami et al. |
| 7,892,666 | B2 | 2/2011 | Nakano et al. |
| 7,892,669 | B2 | 2/2011 | Yang et al. |
| 7,981,538 | B2 | 7/2011 | Kim et al. |
| 2001/0026886 | A1 | 10/2001 | Inui et al. |
| 2005/0089750 | A1 | 4/2005 | Ng et al. |
| 2005/0089751 | A1* | 4/2005 | Oogami et al. ..... H01M 2/1061 429/162 |
| 2005/0170240 | A1 | 8/2005 | German et al. |
| 2006/0259817 | A1 | 11/2006 | Kawai et al. |
| 2007/0037051 | A1 | 2/2007 | Kim et al. |
| 2007/0132429 | A1 | 6/2007 | Onuki et al. |
| 2008/0102362 | A1 | 5/2008 | Nii et al. |
| 2008/0118819 | A1 | 5/2008 | Gamboa et al. |
| 2009/0246615 | A1 | 10/2009 | Park |
| 2010/0021802 | A1 | 1/2010 | Yang et al. |
| 2010/0104932 | A1 | 4/2010 | Heidenbauer |

FOREIGN PATENT DOCUMENTS

| | | |
|---|---|---|
| CN | 1647308 A | 7/2005 |
| CN | 1972005 A | 5/2007 |
| EP | 0666614 A1 | 8/1995 |
| EP | 0962993 A1 | 12/1999 |
| EP | 1139483 A1 | 10/2001 |
| EP | 1523051 A2 | 4/2005 |
| EP | 1530247 A2 | 5/2005 |
| EP | 1575103 A2 | 9/2005 |
| EP | 1753058 A2 | 2/2007 |
| EP | 1848051 A1 | 10/2007 |
| FR | 1556374 A | 2/1969 |
| JP | 2001-060466 A | 3/2001 |
| JP | 2008-98012 A | 4/2008 |
| WO | 99/05747 A1 | 2/1999 |
| WO | 03071616 A2 | 8/2003 |
| WO | 2006114993 A1 | 11/2006 |
| WO | 2007102669 A1 | 9/2007 |
| WO | 2007102670 A1 | 9/2007 |

OTHER PUBLICATIONS

International Search Report, with English translation, of corresponding PCT/EP2009/062718, dated Nov. 25, 2010, 5 pages.
Written Opinion of the International Searching Authority, with English translation, of corresponding PCT/EP2009/062718, dated Nov. 25, 2010, 7 pages.
International Search Report, with English translation, of corresponding PCT/EP2009/062719, dated Sep. 9, 2010, 5 pages.
Written Opinion of the International Searching Authority, with English translation, of corresponding PCT/EP2009/062719, dated Sep. 9, 2010, 8 pages.
International Search Report, with English translation, of corresponding PCT/EP2009/062721, dated Sep. 29, 2010, 5 pages.
Written Opinion of the International Searching Authority, with English translation, of corresponding PCT/EP2009/062721, dated Sep. 29, 2010, 8 pages.
U.S. Office Action dated Apr. 24, 2013, for U.S. Appl. No. 13/121,655 (16 pages).
U.S. Office Action dated Aug. 28, 2013, for U.S. Appl. No. 13/121,655 (17 pages).
USPTO Examiner's Answer to Appeal Brief dated Jun. 6, 2014, for U.S. Appl. No. 13/121,655 (17 pages).
USPTO Patent Board Decision on Appeal dated May 19, 2016, for U.S. Appl. No. 13/121,655 (5 pages).

* cited by examiner

ENERGY ACCUMULATOR MODULE

CROSS-REFERENCE TO RELATED APPLICATIONS

This application is the divisional of U.S. patent application Ser. No. 13/121,664, filed Apr. 19, 2011 which is the U.S. national phase of International Application No. PCT/EP2009/062720 filed Sep. 30, 2009 which claims priority of U.S. 61/101,507, filed Sep. 30, 2008, PCT/EP2009/062151, filed Sep. 18, 2009, PCT/EP2009/062153, filed Sep. 18, 2009, and PCT/EP2009/062152, filed Sep. 18, 2009.

BACKGROUND OF THE INVENTION

The present invention relates to an energy storage module having a plurality of stacked flat cells.

Energy storage modules of this kind are used in a plurality of devices, especially in motor vehicles. They can be combined in order to create an energy storage unit consisting of several modules and having the performance features required in each individual case.

The problem therewith is often that the interconnection of the individual modules, i.e. their appropriate connection to one another, is realized in a relatively extensive manner and that normally additional connection components are required. This also makes assembly of the corresponding energy storage unit more difficult.

It is therefore an object of the present invention to provide an energy storage module which is compact and can be mounted in a simple manner. Furthermore, the energy storage module is to be reliable and efficient.

SUMMARY OF THE INVENTION

This object is achieved by an energy storage module interconnection means formed in such a way that the energy storage module can be connected mechanically, electrically and/or for exchanging coolant with at least one other energy storage module of the same kind. In other words, the energy storage module according to the invention already has the components required for connection to adjacent modules of the same kind. The respective interconnection means need only be mounted in order to functionally couple the energy storage modules to one another. Thus, several ones of the energy storage modules form a flexible modular construction system in order to be able to assemble energy storage units in varying configurations by using modules of the same kind.

Advantageous embodiments of the invention are mentioned in the detailed description and the accompanying drawings.

Advantageously, the energy storage module has cooling elements for cooling the flat cells, wherein the cooling elements are arranged between the flat cells and are in particular plate-shaped. Efficient cooling of the flat cells is possible by means of the cooling elements which are arranged between the flat cells so that, even during an operation of the energy storage module which always involves heat losses, a temperature range can be maintained which enables efficient use of the energy storage module.

According to an advantageous embodiment, the energy storage module at a first side has first mechanical, electrical and/or coolant interconnection means, wherein the energy storage module at a second side opposing the first side has second mechanical, electrical and/or coolant interconnection means, respectively. In the case of this embodiment, the first interconnection means and the second interconnection means are arranged at symmetrical positions with respect to one another and formed in mutually complementary shapes.

The interconnection means of the first side are thus formed in such a way that they supplement the interconnection means of the second side, and vice versa. The interconnection means are spatially arranged relatively to one another in such a way that their connection is possible without anything else, in particular without any additional components. Herein the configuration of the interconnection means is complementary, i.e. they are matched with respect to one another and compatible in order to enable a simple connection between the modules. Herein, a connection is understood to be, for example, a mechanical connection combining two adjacent energy storage modules to form a mechanical unit. An electrical connection is understood to be, for example, a connection wherein two adjacent energy storage modules are electrical with one another in order to be able to supply energy to a unit made up of the two energy storage modules or to discharge energy from the unit.

The fact that coolant is exchanged between adjacent energy storage modules simplifies a coolant system of a unit made up of several energy storage modules, because it is not required to supply each energy storage module independently of the other modules with coolant. Rather, several modules together form a system—as it is ultimately the case with the mechanical connection and the electrical connection. In order to create a coolant system, the embodiment of the energy storage module described has coolant interconnection means compatible with corresponding interconnection means of modules of the same kind.

The flat-cell stack can be held together by a fixing arrangement having two pressure plates, which are associated with opposing end face sides of the flat-cell stack and connected to one another by means of at least one resilient element.

Mechanical pressure is applied to the flat cells by co-operation of the pressure plates and the resilient element. This pressure increases the stability of the stack and has a positive effect on the service life and the performance of the individual flat cells as long as the pressure does not exceed certain limits. Moreover, the mechanical pressure improves thermal coupling between the flat cells and the so-called cooling elements, whereby the heat losses of the flat cells can be dissipated more efficiently.

In order to create a mechanical connection between two adjacent energy storage modules, each of the pressure plates can have at least one attachment flange, by means of which the energy storage module can be attached to an adjacent energy storage module of the same kind, in particular to one of the pressure plates of the adjacent energy storage module of the same kind.

A pressure acting evenly on the flat-cell stack can be created in case at least one first resilient element extends along a first longitudinal side of the flat-cell stack between the two pressure plates and at least one second resilient element extends along a second longitudinal side of the flat-cell stack between the pressure plates. The first resilient element and the second resilient element are preferably arranged at complementary positions with respect to one another, in particular at different heights, in order to be able to interconnect two energy storage modules of the same kind in a compact manner.

In order to attach the resilient elements, the pressure plates can have attachment segments arranged at two opposing sides, wherein the attachment segments protrude, in the plane of the respective pressure plate, beyond the pressure plates and the flat-cell stack. Herein the attachment segments are also arranged at complementary positions with respect to one another.

In case at least some of the interconnection means are plug-in connectors, which are in particular detachable, assembly or connection of two energy storage modules can be realized by simple insertion, which accelerates assembly and reduces assembly costs. By providing a detachable connection, a defective module forming a constituent part of a larger energy storage unit can, for example, be replaced in a simple manner.

Provision can be made for the energy storage module having a connection unit which interconnects the flat cells at least electrically and is formed in particular as a plate extending in a plane perpendicular to the respective extension plane of the flat cells. Thus, the connection unit forms a contacting element for electrically interconnecting the flat cells serially or in parallel. The flat cells can also be connected to one another through a mixed form of parallel and serial interconnection. The connection unit can additionally provide mechanical stabilization.

Preferably, electrical interconnection means are arranged at the connection unit, wherein the electrical interconnection means are formed as a plug and a socket, respectively.

Provision can be made for the energy storage module having at least one coolant duct opening into a coolant inlet at a first side of the energy storage module and into a coolant outlet at a second side of the energy storage module. The coolant duct can extend perpendicularly or in parallel to the flat cells. In order to be able to provide larger cooling capacities, it is also conceivable to provide more than one coolant line.

The invention further relates to an energy storage unit comprising at least two energy storage modules according to at least one of the previously described embodiments.

The energy storage modules can be arranged in a two-dimensional or three-dimensional matrix in order to make optimum use of the construction space available.

Especially in the case of the embodiments of the energy storage unit in a multi-dimensional arrangement—i.e. in particular in case there is not only a purely serial arrangement of modules—at least one adapter means can be provided for connecting at least two energy storage modules to one another. For example, two energy storage modules forming end members of their respective row of energy storage modules can be connected to one another in this way.

The flat-cell stack of energy storage modules arranged in a row and functionally coupled to one another can be arranged one after another or side by side. It is also conceivable that an energy storage unit having several energy storage modules has both variants if this is required.

In the case of embodiments of the energy storage unit having at least two energy storage modules, each of which comprises a fixing arrangement having two pressure plates, the adjacent pressure plates of the two energy storage modules can be coupled mechanically to one another, in particular by means of corresponding attachment flanges of the pressure plates.

According to a special embodiment of the invention, the invention is not only suitable for application in lithium-ion accumulators/cells, but can also be used for/in other energy storages, such as NiMH (nickel metal hydride) energy storages/cells and/or capacitor storage cells, in particular double-layer capacitor cells (supercaps).

BRIEF DESCRIPTION OF THE DRAWINGS

Hereinafter the present invention will be explained merely by way of example by means of advantageous embodiments with reference to the accompanying drawings, wherein.

DETAILED DESCRIPTION

Figure 1:
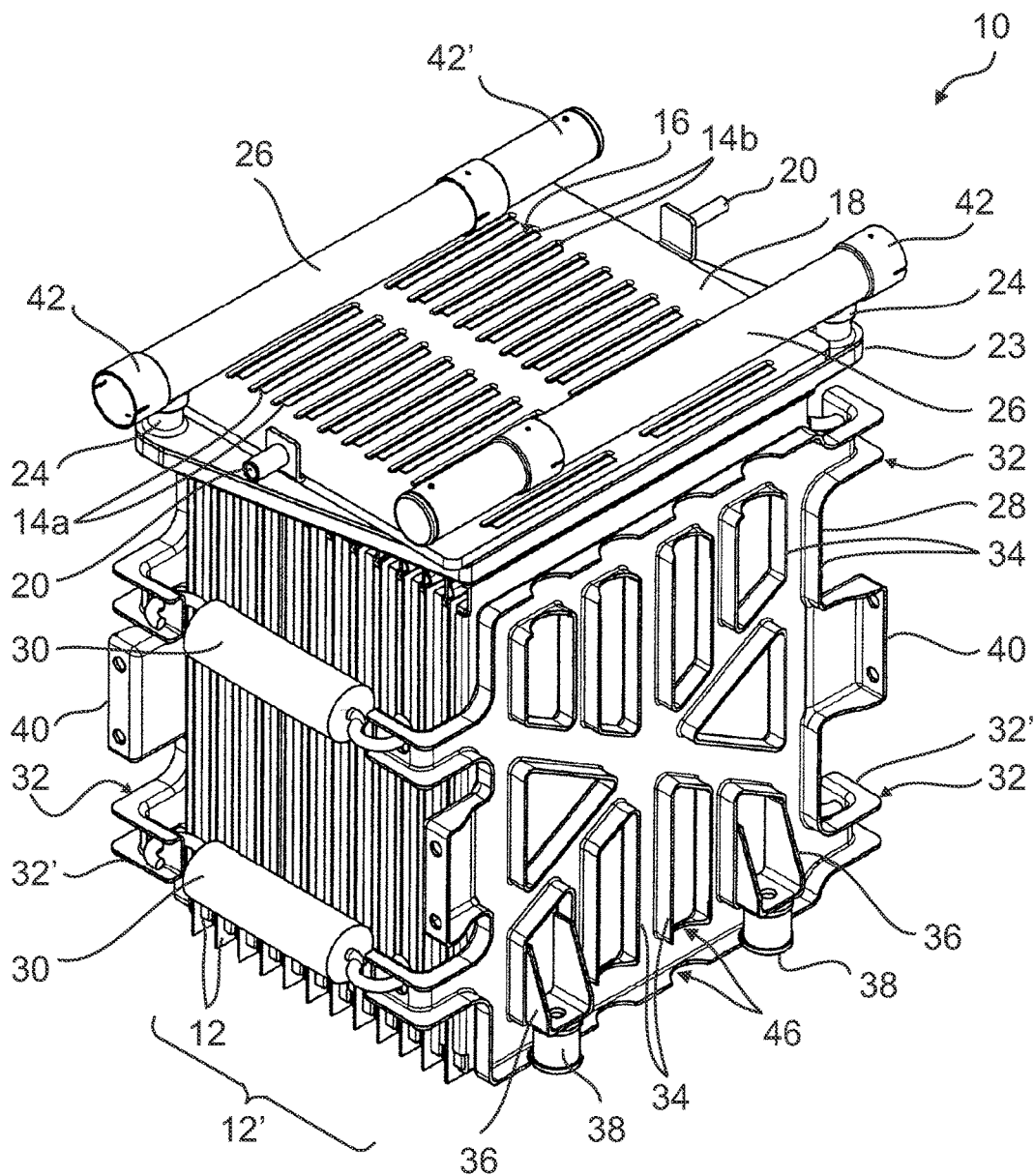
FIG. 1 shows a perspective view of a first embodiment of an energy storage module.

FIG. 1 shows a perspective view of an energy storage module 10 comprising a plurality of prismatic cells/flat cells 12 arranged in a cell stack 12' in parallel with respect to one another. The flat cells 12 can, for example, be lithium-ion accumulator cells or double-layer capacitor cells ("supercaps"). Each of the individual cells 12 has two electrode tabs 14a, 14b, which are inserted through slots 16 of an interconnection board 18 provided for this purpose. The electrode tabs 14a, 14b reach through the interconnection board 18 and are, at the free top side thereof—i.e. at the side of the interconnection board 18 facing away from the flat cells 12—, connected to contact surfaces not shown, in order to provide electrical contact between the flat cells 12. The contacting between the flat cells 12 can, for example, be parallel or serial or comprise a mixed form of parallel and serial contacting.

The electrical energy stored in the flat cells 12 can be tapped via a plug and a corresponding socket, which are hereinafter summarily referred to simply as a plug 20. The plugs 20 are arranged at opposing sides of the interconnection board 18. Similarly, plugs/sockets can be provided for the data lines, which are, however, not shown. The data lines can, for example, serve to transmit temperature information on the energy storage module 10 and/or information about the voltage condition of the flat cells 12.

Planar-shaped, plate-like cooling elements 22 are arranged between adjacent flat cells 12 (see FIG. 2), in order to be able to efficiently dissipate heat losses developing during operation of the energy storage module 10, primarily in the flat cells 12. In order to better stabilize the stack 12' and to improve thermal coupling, the flat cells 12 and the cooling elements 22 can be glued to one another.

The cooling elements 22 are heat-conductively connected to a cooling body 23 integrated in the interconnection board 18 or attached thereto. The cooling body 23 is connected to coolant lines 26 via connecting pieces 24. One of the coolant lines 26 is, for example, a supply line for coolant, while the other coolant line 26 is a discharge line. The coolant supplied to the cooling body 23 can be lead through ducts suitably formed in the cooling body 23, in order to, on the one hand, effect planar cooling of the interconnection board 18, which heats up due to conduction of electric current, and, on the other hand, to dissipate the heat losses of the flat cells 12 taken up by the cooling elements 22.

The cooling body 23 has slot-like openings not shown, through which the electrode tabs 14*a*, 14*b* of the flat cells 12 extend such that the electrode tabs 14*a*, 14*b* can be lead to the free surface of the interconnection board 18.

In order to hold the flat-cell stack 12' together, two pressure plates 28 are provided, limiting the two end face surfaces of the flat-cell stack 12'. The two pressure plates 28 are not firmly connected to one another, since the thickness of the stack 12' varies during operation of the energy storage module 10 due to thermal effects and/or dimensional/thickness changes of the flat cells 12 caused by ageing as well as voltage conditions. Therefore the two pressure plates 28 are interconnected through tension springs 30. The resilient properties of the tension springs 30 are designed such that, on the one hand, sufficiently good coherence of the flat-cell stack 12' is guaranteed, while, on the other hand, also the previously described dimensional changes, which cannot be avoided, are permitted to an acceptable extent.

Attachment brackets 32 are provided for attaching the tension springs 30 to the pressure plates 28, wherein the attachment brackets 32 laterally protrude beyond the flat-cell stack 12' and each of the attachment brackets 32 has a portion 32' extending in a direction perpendicular to the planes formed by the flat cells 12. The portions 32' thus run in parallel displacement to a stack axis A (see FIG. 2) extending through the center of the flat-cell stack 12' perpendicularly to the planes formed by the flat cells 12.

Suitable devices for attaching the tension springs 30 are provided at the portions 32'. The figure shows openings/holes engaged by hooks of the tension springs 30. It is to be understood that any kind of attachment means can be used at this point. Furthermore, the tension springs 30 can be replaced by any other suitable resilient elements. Even the number of the tension springs 30/resilient elements is arbitrary and can be adapted to the conditions prevailing in each individual case. Ultimately, it is essential that suitable mechanical pressure is exerted on the flat cells 12 in order to stabilize the stack 12'. Moreover, a modest application of pressure increases the performance and the service life of the flat cells 12. The pressure distribution produced should additionally be sufficiently homogeneous in order to avoid excessive one-sided loads on the cells 12. For this reason, tension springs 30 are provided at both side surfaces of the stack 12', as described hereinafter. However, it is in principle possible to alternatively provide a one-sided arrangement of a resilient element opposed by a hinge-like portion on the other side.

The pressure plates 28 have ribs 34 for stiffening, whereby—as compared to massive plates—material and weight is saved while maintaining equal stability. Additionally, mounting brackets 36 are provided at the pressure plate 28, which serve to support the energy storage module 10 in its installed position. The installed position normally corresponds to the position shown, i.e. the interconnection board 18 is arranged at the top. In certain cases the installed position can also be defined differently. In these cases a correspondingly altered arrangement of the mounting brackets 36 is required.

Each of the mounting brackets 36 is provided with a dampening element 38, which, in the installed position of the energy storage module 10, dampens a transmission of vibrations of a bearing surface, on which the energy storage module 10 is supported, to the energy storage module 10. Preferably, the dampening elements 38 are at least partially made of rubber, a plastic material and/or other suitable resilient materials. In an assembled state of the energy storage module 10, its weight thus rests on the dampening elements 38 and the mounting brackets 36, respectively. Provided that herein the resilient properties of the dampening elements 38 are chosen correspondingly, it is sufficient if the dampening elements 38 protrude only to a small extent downwardly beyond the pressure plates 28 (hardly recognizable in FIG. 2). Alternatively or additionally, the mounting points of the bearing surface/mounting surface, which is contacted by the energy storage unit 10 in an assembled state, can be raised punctually in the area of the dampening elements 38 associated with them. Thus the pressure plates 28 not only have the function of holding the stack 12' together, but also act as structural elements supporting the whole energy storage module 10 via the mounting brackets 36 and the dampening elements 38.

Figure 2:
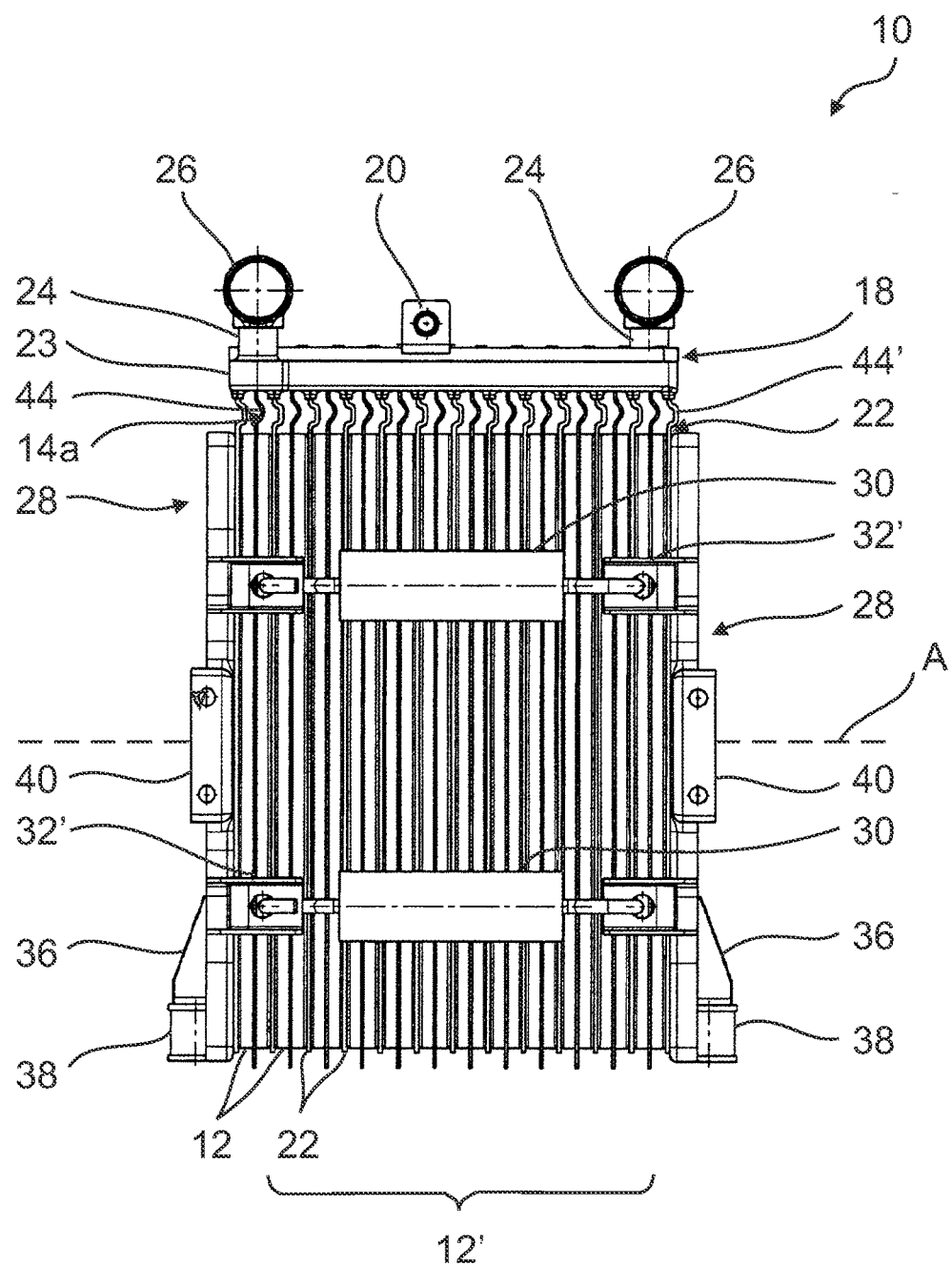
FIG. 2 shows a first side view of the energy storage module of FIG. 1.

As can be seen in FIGS. 1 and 2, the dampening elements 38 primarily serve to dampen vibrations of the bearing surface/mounting surface in a vertical direction. This does not mean, however, that lateral vibrations are not dampened.

Since the energy storage unit 10 contacts the bearing surface/mounting surface only via the dampening elements 38, electrical decoupling of the energy storage unit 10 and the bearing surface/mounting surface is achieved in a simple way by the fact that the dampening elements 38 are at least partially made of an electrically insulating material.

In order to enable safe and reliable assembly of the energy storage module 10, the pressure plates 28 are at two opposing sides thereof provided with attachment flanges 40 protruding beyond the cell stack 12'. The attachment flanges 40 enable to additionally attach the energy storage module 10 to another bearing component and/or an adjacent energy storage module 10, as described hereinafter.

The energy storage module 10 has a number of connection means, which have the purposes of mechanical connection of the energy storage module 10 to its environment, electrical contacting as well as supply with coolant. The mechanical connection means comprise—as already mentioned—the attachment flanges 40 as well as the mounting brackets 36 and the dampening elements 38 associated therewith. The electrical connection is enabled by the plugs 20. A connection to a coolant system is realized via coolant connectors 42, 42' of the coolant lines 26.

Herein the coolant connectors 42' are designed in such a way that they can be inserted in corresponding coolant connectors 42 of an adjacent energy storage module 10 (and vice versa), in order to create connections between the coolant lines 26.

The coolant connectors 42, 42', the attachment flanges 40 and the plugs 20 are spatially arranged in such a way that connection of an energy storage module 10, which is of the same type at least with regard to the connectors 42, 42', 20, is possible to two opposing side surfaces of the cell stack 12'.

Therefore the coolant lines 26 extend perpendicularly to the stack axis A in a plane which is parallelly displaced from the interconnection board 18.

FIG. 2 shows a view of the left side of the energy storage module 10 of FIG. 1, whereby the structure of the stack 12' composed of alternatingly arranged flat cells 12 and cooling elements 22 can be clearly seen. The electrode tabs 14a, 14b and the ends of the cooling elements 22 facing towards the interconnection board 18 have depressions 44 and 44', respectively, which are provided for taking up the previously described relative movements of the individual components during operation of the energy storage module 10. The depressions 44, 44' additionally take up manufacturing tolerances of the components used.

Further, it can be seen in FIG. 2 that the mounting brackets 36 of the pressure plates 28 laterally rise from the respective plane of the corresponding pressure plate 28.

Figure 3:
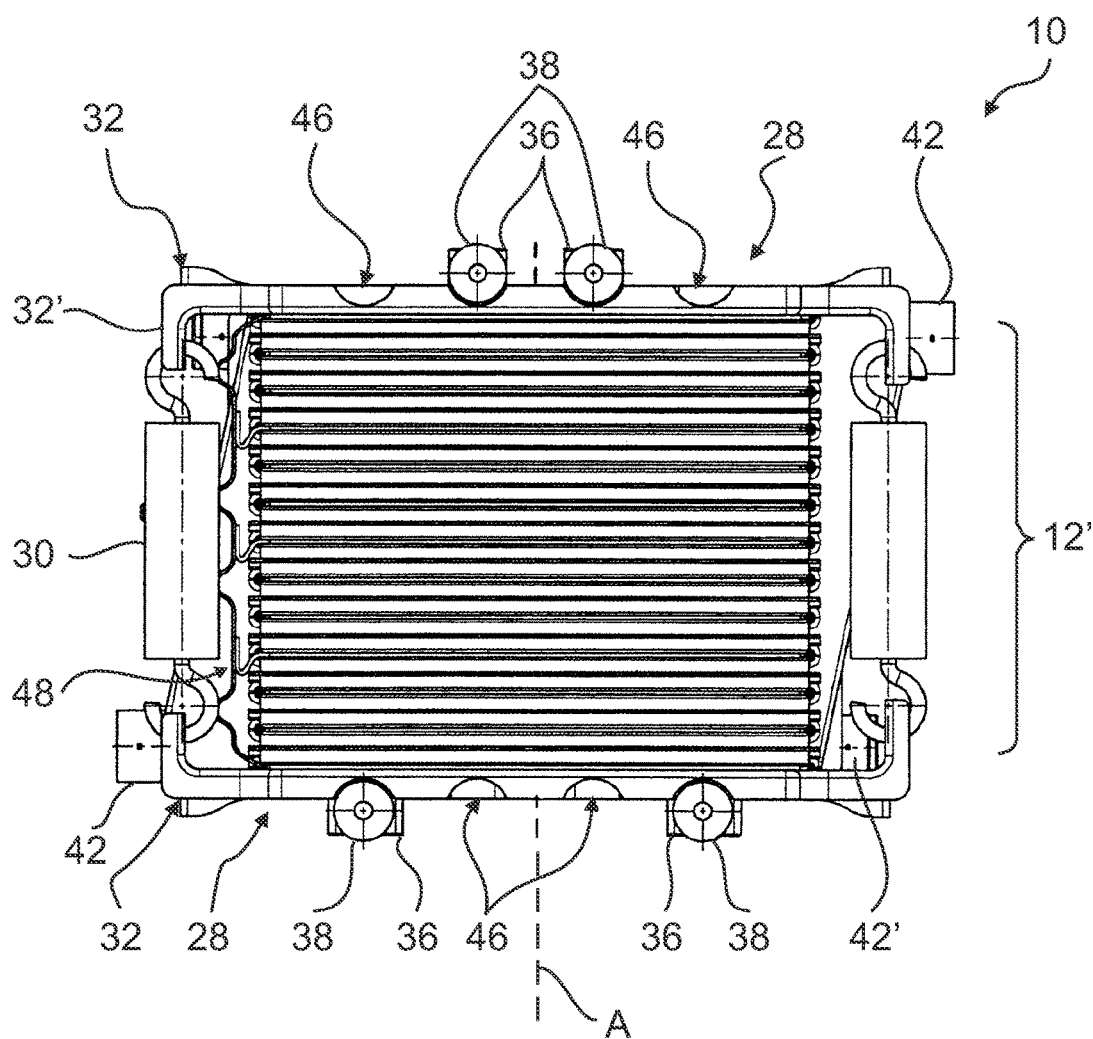
FIG. 3 shows a bottom view of the energy storage module of FIG. 1.

FIG. 3 shows a bottom view of the energy storage module 10 of FIG. 1. This view clarifies the positioning of the mounting brackets 36 and of the dampening elements 38, respectively. Each of these components is arranged at the outside of the corresponding pressure plate 28; however, they are positioned at different places with respect to the stack axis A. The mounting brackets 36/dampening elements 38 of the lower pressure plate 28 are arranged more outwardly—and thus further away from the stack axis A—than the mounting brackets 36/dampening elements 38 of the upper pressure plate 28. In return, recesses 46 are provided at the corresponding (complementary) places of the respectively opposing pressure plate 28, which are formed for taking up dampening elements 38 of adjacent energy storage cells 10. As can be seen in FIG. 1, the recesses 46 are not only provided in the rim of the pressure plates 28, but also in a part of the ribs 34.

In conjunction with FIG. 3 it is to be mentioned further that the coolant connectors 42 laterally protrude not only beyond the cell stack 12', but also beyond the attachment brackets 32 of the pressure plates 28, in order to simplify connection of the coolant lines 26.

Figure 4:
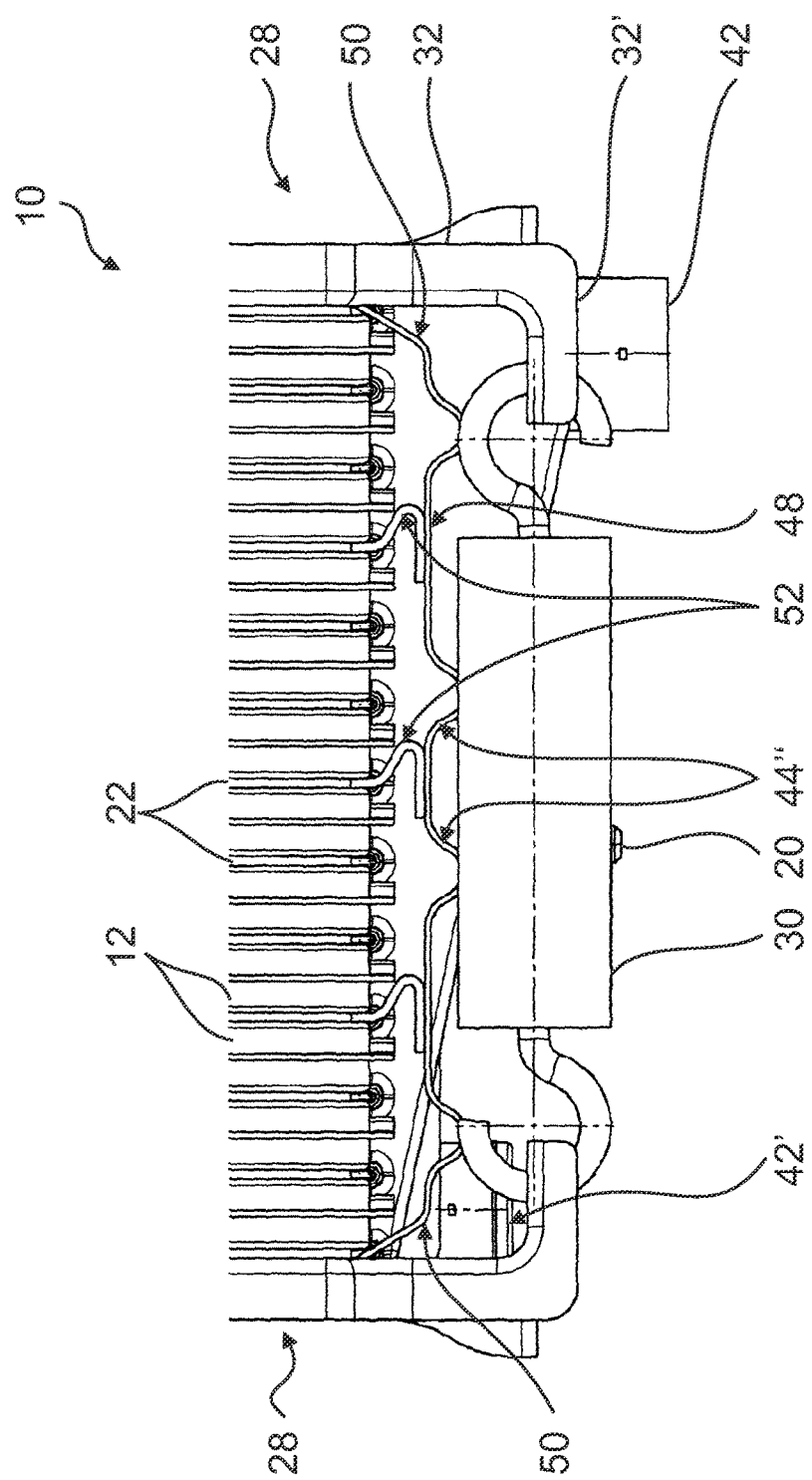
FIG. 4 shows a detailed view of FIG. 3.

The left side in FIG. 3 of the flat cell stack 12 is protected by a partition plate 48 extending between the pressure plates 28. The design of the partition plate 48 can be more clearly seen in FIG. 4, showing a detailed view of FIG. 3.

The partition plate 48 has depressions 44" and bendings 50, imparting stability to the partition plate 48, on the one hand. On the other hand, the partition plate 48 is also given resilient properties thereby, allowing relative movements of the pressure plates 28. In principle, it is possible to design the partition plate 48 such that the tension springs 30 can be omitted. Then the partition plate 48 has corresponding resilient properties, holding the pressure plates 28 together. In this case, a suitably dimensioned and correspondingly designed attachment of the partition plate 48 to the pressure plates 28 is to be guaranteed. Differently from the embodiment shown, wherein a partition plate 48 is only present at the left side of the stack 12', a partition plate 48 can be provided at both free sides of the cell stack 12'. This is especially advantageous in cases where the partition plate 48 is provided as a resilient element instead of the tension springs 30.

The partition plate 48 has, among others, the additional function of acting as a kind of bulkhead—especially in the case of a fire—having a protective effect between adjacent energy storage modules 10. Therefore it is in principle sufficient for performing this function that a partition plate 48 is provided only at one side of each energy storage module 10.

The partition plate 48 also increases the mechanical stability of the cell stack 12' by being connected to some of the cooling elements 22 by means of angled portions 52. The cooling elements 22, which are thereby restricted in their lateral mobility, stabilize the cell stack 12'. There is no complete inhibition of relative movements between the partition plate 48 and the respective cooling elements 22 provided with an angled portion 52. Therefore the angled portions 52 are not simple angles, but rather have an S-shaped character in order to allow lateral movements of the flat cells 12 to a certain extent due to thickness variations of the cell stack 12'. Thus the mechanical pressure acting on the individual flat cells 12 is influenced by the described embodiment of individual cooling elements 22 in co-operation with the partition plate 48. The pressure acting on the cells 12 can in turn—as already mentioned—have a positive effect on their service life and efficiency.

Figure 5:
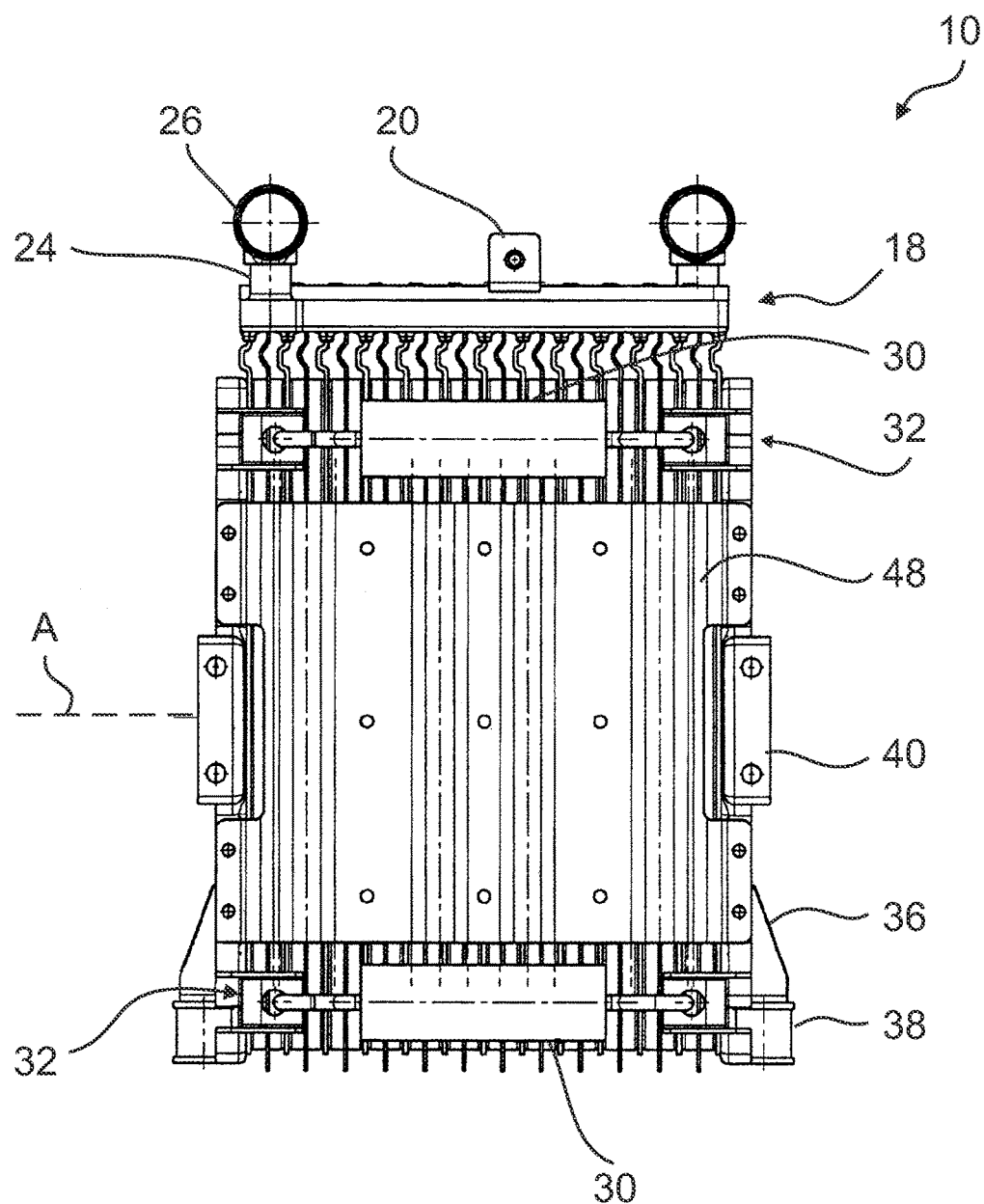
FIG. 5 shows a second side view of the energy storage module of FIG. 1.

FIG. 5 shows another side view of the energy storage module 10. The side shown is opposite the side of the flat cell stack 12' shown in FIG. 2. The side view of FIG. 5 clarifies that the partition plate 48 does not cover the whole side surface of the cell stack 12'. The tension springs 30 extend in the lower and upper region; this is why sheathing of the cell stack 12 has been omitted here.

It is to be noted that the tension springs 30—and consequently also the attachment brackets 32 and the corresponding portions 32'—are arranged further upwardly or further downwardly, i.e. nearer to the interconnection board 18 (in its installed position normally at the top) and nearer to the dampening elements 38 (in their installed position normally at the bottom), respectively, than at the opposing side (compare FIG. 2). This complementary configuration enables a space-saving connection of two energy storage modules 10.

Figure 6:
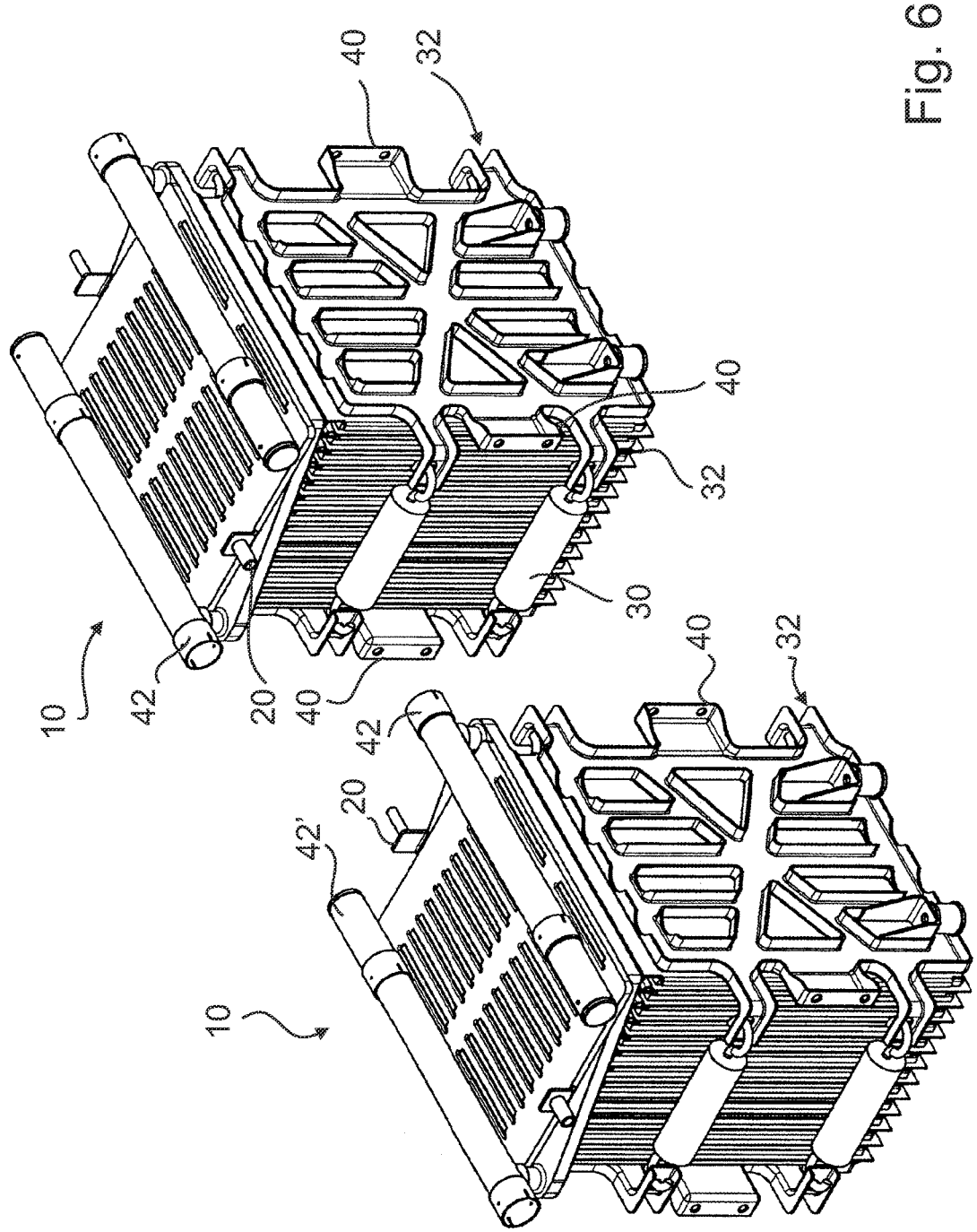
FIG. 6 shows a perspective view of two energy storage modules according to FIG. 1 in a non-coupled state.

FIG. 6 clarifies how two energy storage modules 10 of the same type can be combined to form an energy storage unit. For this purpose, at first two energy storage modules 10 are arranged next to one another—as shown—in such a way that the side shown in FIG. 2 of the right energy storage module 10 faces the side shown in FIG. 5 of the left energy storage module 10. The corresponding sides of the two energy storage modules 10 are complementary, i.e. they supplement one another/are matched to one another. The two energy storage modules 10 now only have to be moved towards one another until the coolant connectors 42, 42' are connected to the respective complementary coolant connector 42' and 42, respectively, of the adjacent energy storage module 10. Since the tension springs 30 at the sides facing one another of the two energy storage modules 10 are arranged in complementary positions—i.e. at different heights—the modules 10 can be brought close to one another. The attachment flanges 40 of the two energy storage modules 10 are, in contrast, located at the same height, which means that a mechanical connection of the pressure plates 28, both lying in one plane, of the adjacent modules 10 is possible. By bringing the two modules 10 closer together, the plugs 20, which are opposite one another and have complementary shapes, of the adjacent modules 10 also come into mutual contact, which means that also an electrical contacting of the two modules 10 is guaranteed.

In the case of the embodiment shown of the energy storage modules 10, the coolant connectors 42, 42' are designed such that a fluid-tight connection is created without any further components and/or assembly steps being necessary. The same is true for the electrical contacting via the plugs 20. Only the attachment flanges 40 have to be interconnected by means of screws or similar attachment means.

It is to be understood that the attachment flanges 40—as the coolant connectors 42, 42' and the plugs 20—can have plug-in connections. Vice versa, for example, screw connections and/or supplementary connection components can be provided for additionally securing the connections 42, 42', 20.

Figure 7:
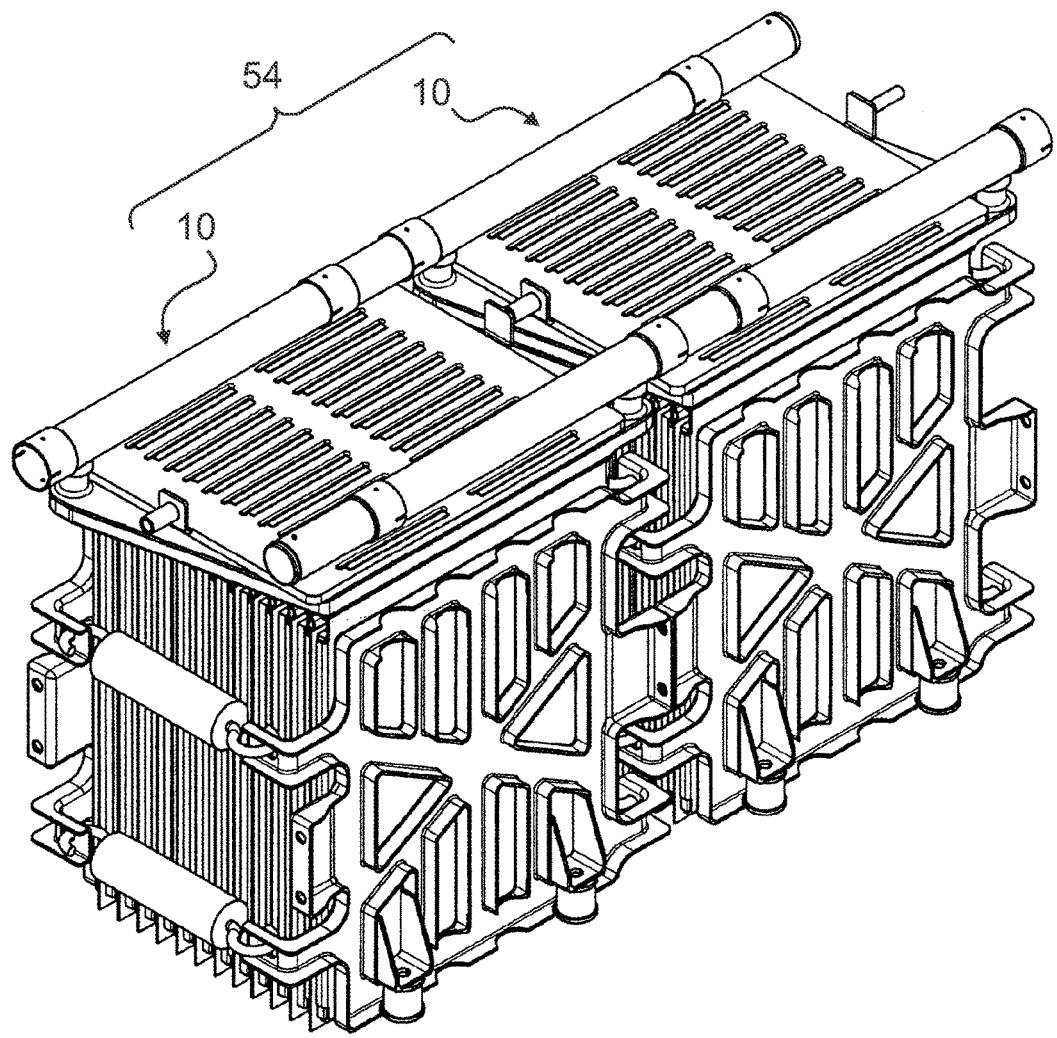
FIG. 7 shows a perspective view of two energy storage modules according to FIG. 1 in a coupled state.

FIG. 7 shows two interconnected energy storage modules 10, now forming an energy storage unit 54. The assembly—with the exception of securing the attachment flanges 40—has been completed. The complementary arrangement of the tension springs 30 enables a compact design of the energy storage unit 54. The energy storage unit 54 has two cell stacks 12' located side by side, i.e. the stack axes A of the two stacks 12' are arranged in parallel displacement with respect to one another.

The configuration of the plugs 20 and the coolant connectors 42, 42' at complementary positions and in complementary shapes guarantees a safe and reliable connection of the energy storage modules 10 to form the energy storage unit 54. It is to be understood that any number of energy storage modules 10 can be combined in order to be able to provide an energy storage unit 54 which meets the requirements present in each individual case. Herein the individual energy storage modules 10, however, do not necessarily have to be arranged in a row only (one-dimensional arrangement), since also a connection of several, especially parallel rows is possible by means of suitable adapter pieces. A multi-row energy storage unit 54 then has a two-dimensional extension (2D matrix). An adapter piece at the end of a row of energy storage modules 10 can, for example, have tube pieces having a curvature of 180° for the coolant lines 26. Furthermore, the adapter piece can comprise an electric lead for connecting the last plug 20 of a row of energy storage modules 10 to the first plug 20 of the adjacent row.

Even a three-dimensional arrangement of energy storage modules 10 can be realized in a simple manner (3D matrix), in order to, for example, fill available construction space as efficiently as possible with energy storage modules 10. In this case, corresponding adapter pieces for coolant connections and electrical connections between the various planes are required.

Depending on the configuration and the number of the energy storage modules 10 to be connected over several planes, additional distance pieces or carrier segments can be provided in order to stabilize the energy storage unit 54.

Figure 8:
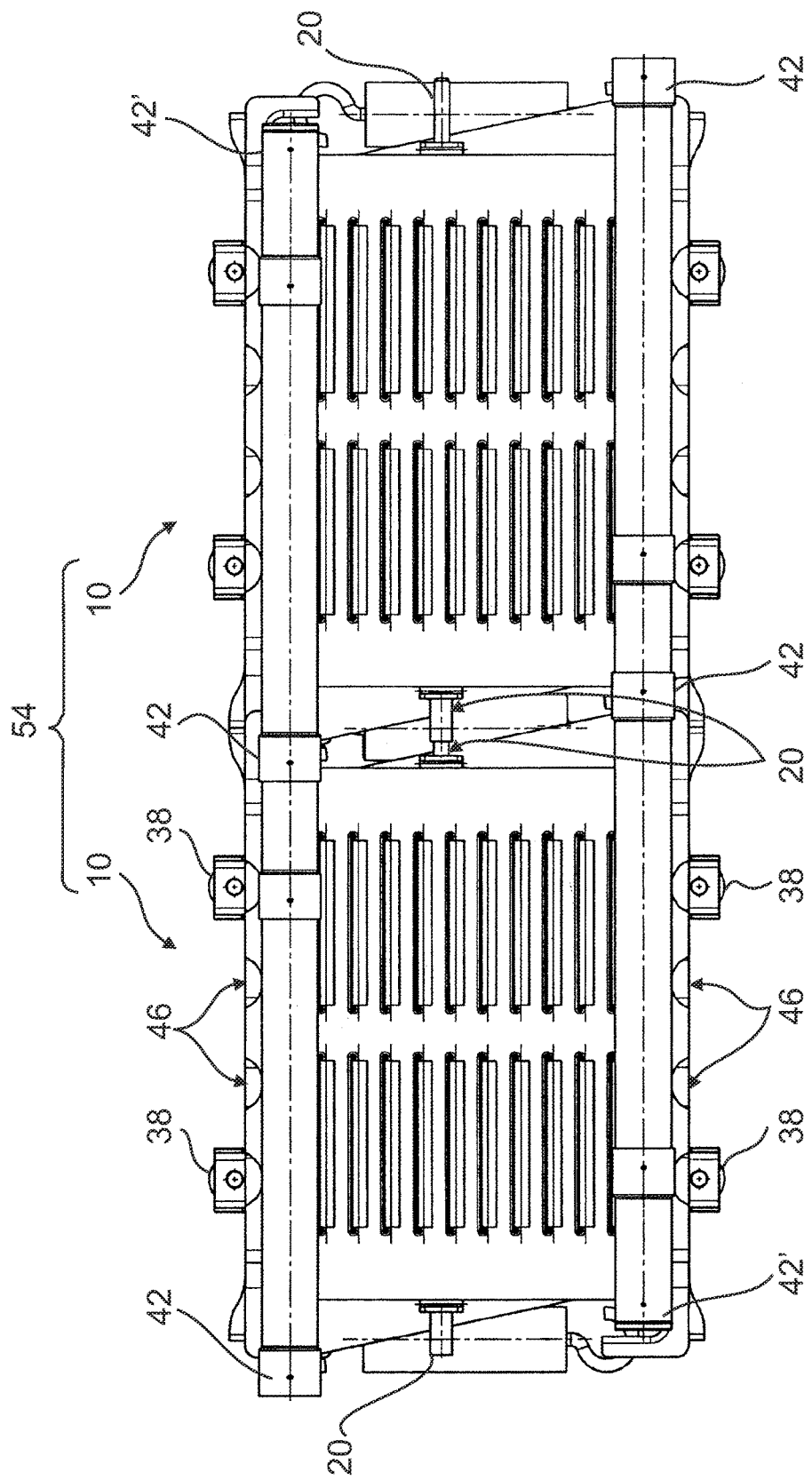
FIG. 8 shows a top view of two energy storage modules according to FIG. 1 in a coupled state.

FIG. 8 shows a top view of the energy storage unit 54 of FIG. 7. Since in the case of this special configuration of the energy storage unit 54 no side-by-side rows of energy storage modules 10 are provided, the dampening elements 38 of the individual energy storage modules 10 in FIG. 8 are each situated at the top and at the bottom at the same height. Identically formed energy storage modules 10 would then be capable of being arranged only at a certain distance/with a certain offset from the shown energy storage modules 10. The mentioned problem does not occur if the dampening elements 38 are arranged in the configuration shown in FIG. 3. Alternatively, provision could also be made for the dampening elements 38 of adjacent rows of energy storage modules 10 having dampening elements 38 at both sides and arranged nearer to one another, so that they can be introduced into the recesses 46 of the shown modules 10, wherein the recesses 46 are located in the middle area of the respective pressure plates 28.

FIG. 8 further shows the configuration of the plugs 20 at complementary positions and in complementary shapes. It is to be seen that the right plug 20 of the left energy storage module 10 is inserted/plugged in the left plug 20 of the right module 10, in order to guarantee reliable electrical contacting. The coolant connectors 42, 42' have a corresponding complementary configuration. The coolant connector 42 is somewhat longer than the coolant connector 42' and laterally protrudes beyond the corresponding interconnection board 18. Due to this fact the coolant connector 42 can at least partially be slid onto the coolant connector 42' of the adjacent energy storage module 10.

Figure 9:
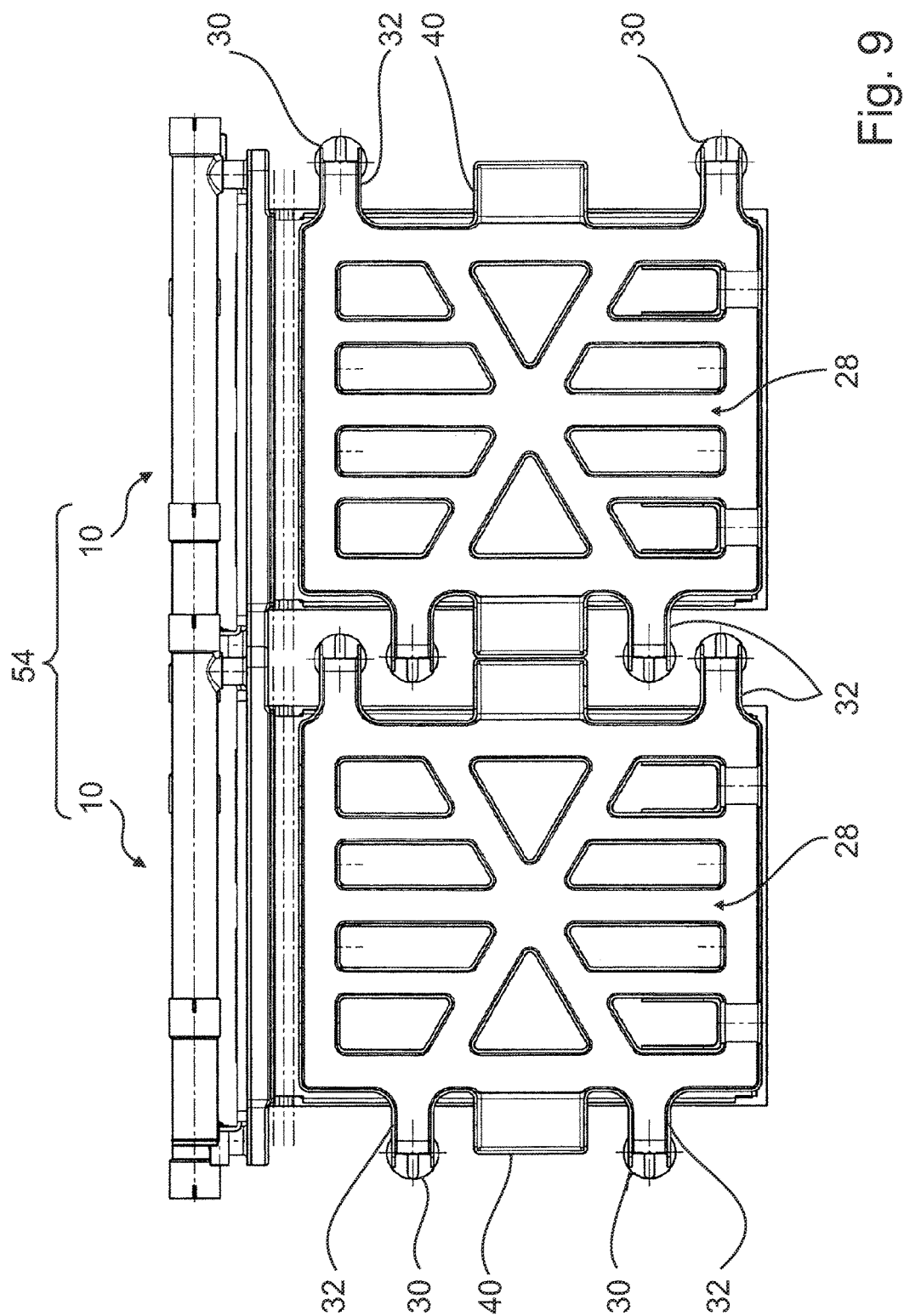
FIG. 9 shows a side view of two energy storage modules according to FIG. 1 in a coupled state.

FIG. 9 shows a side view of the energy storage unit 54 for illustrating the configuration of the attachment brackets 32 at complementary positions. The attachment brackets 32, at which the portions 32', which cannot be seen in this representation, are arranged as attachment points for the tension springs 30, are formed at the left side of the respective pressure plate 28 in spatial proximity to the attachment flange 40. The left attachment flange 40 is located approximately at medium height of the pressure plate 28. A further attachment flange 40 is provided at the right side of the respective pressure plate 28, which attachment flange 40 is arranged also at medium height for connection to the left attachment flange 40 of the adjacent pressure plate 28. The right attachment brackets 32 are located in the region of the upper and the lower rims, respectively, of the pressure plate 28, so that the left attachment brackets 32 of the adjacent pressure plate 28 are able to engage in a space between the right attachment brackets 32 and the right attachment flange 40.

The tension springs 30 of the adjacent energy storage modules 10 are, in an assembled state of the energy storage unit 54, essentially in a vertical plane which is defined by the lateral contact surfaces of the attachment flanges 40 of the adjacent pressure plates 28 and in which also the portions 32' are located.

Figure 10:
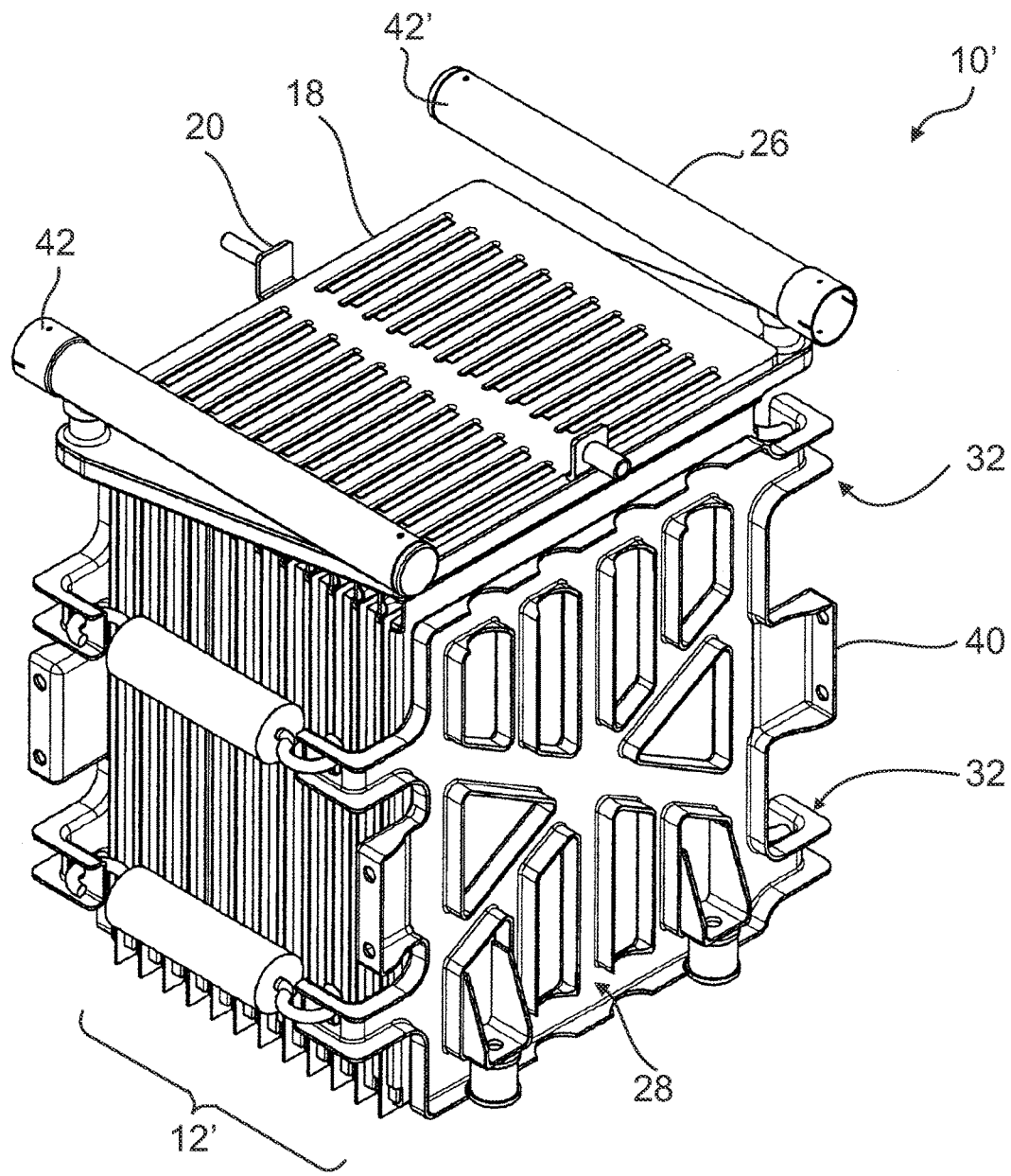
FIG. 10 shows a perspective view of a second embodiment of an energy storage module.
Figure 11:
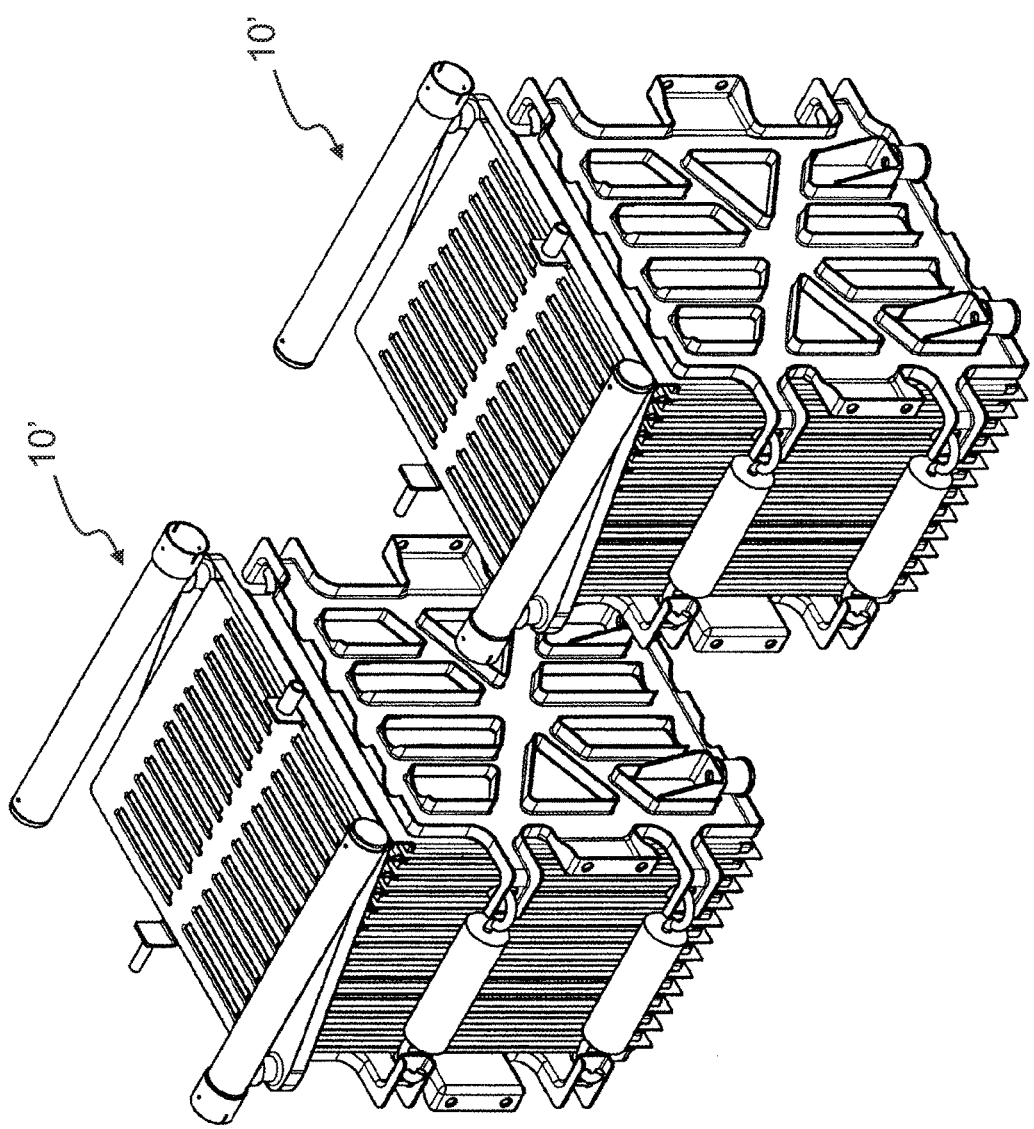
FIG. 11 shows a perspective view of two energy storage modules according to FIG. 10 in a non-coupled state.

FIG. 10 shows a further embodiment 10' of the energy storage module. The energy storage module 10' differs from the energy storage module 10, among other things, by the fact that the coolant lines 26 do not extend in parallel to the flat cells 12 and the cooling elements 22, respectively, or the pressure plates 28, but perpendicularly thereto. Thus they extend in parallel to the tension springs 30. Furthermore, the plugs 20 are not arranged at a side of the interconnection board 18 corresponding to a side surface of the flat-cell stack 12', but they protrude beyond the interconnection board 18 at the sides extending in parallel to the pressure plates 28. Due to the previously described arrangement of the plugs 20 and the coolant lines 26 and the coolant connectors 42, 42', there is provided a connection of two adjacent energy storage modules 10', wherein in each case one of their pressure plates 28 is opposite to another, as shown in FIG. 11. The configuration of the pressure plate 28, the flat-cell stack 12' and the tension springs 30 of the energy storage module 10' otherwise essentially corresponds to the corresponding components of the energy storage module 10.

As already mentioned, FIG. 11 clarifies in which way the energy storage modules 10' are joined together for forming an energy storage unit 54'. The result is shown—from a different perspective—in FIG. 12.

Figure 12:
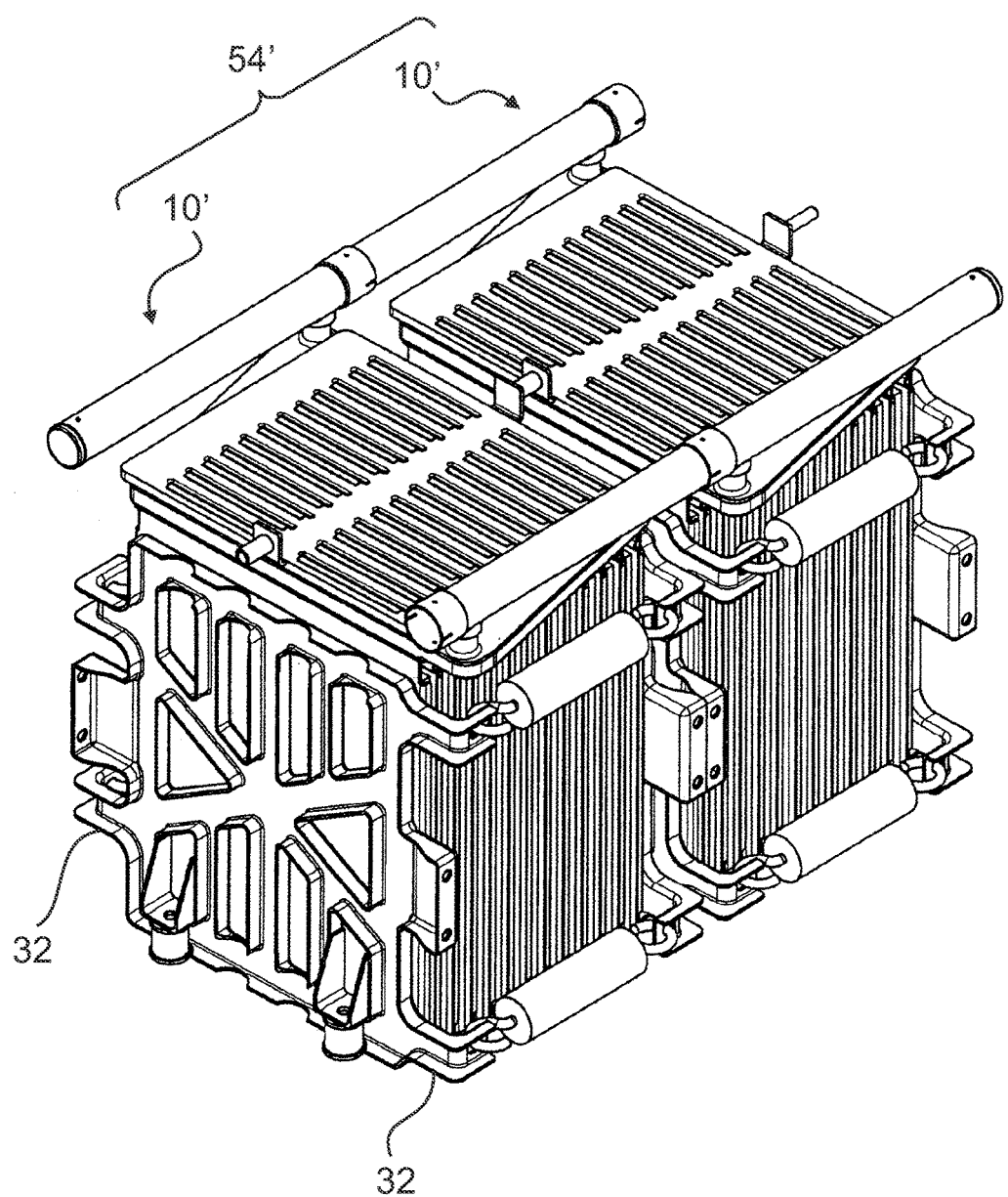
FIG. 12 shows a perspective view of two energy storage modules according to FIG. 10 in a coupled state.

FIG. 12 shows that a compact energy storage unit 54' can also be created with two energy storage modules 10'. Due to the arrangement of the attachment brackets 32 at complementary positions, as already described with regard to the energy storage module 10, further energy storage modules 10' can readily be joined laterally to the energy storage unit 54 in a space-saving manner.

In the case of the energy storage unit 54' shown in FIG. 12, the configuration of the attachment flanges 40 requires a somewhat different attachment than in the case of the energy storage unit 54. However, this attachment can be realized, for example, in a simple manner by means of a small plate which is secured to adjacent attachment flanges 40 by means of four screws and thus holds them together. A laterally adjacent energy storage unit 54' can also be secured to the attachment flanges 40.

Figure 13:
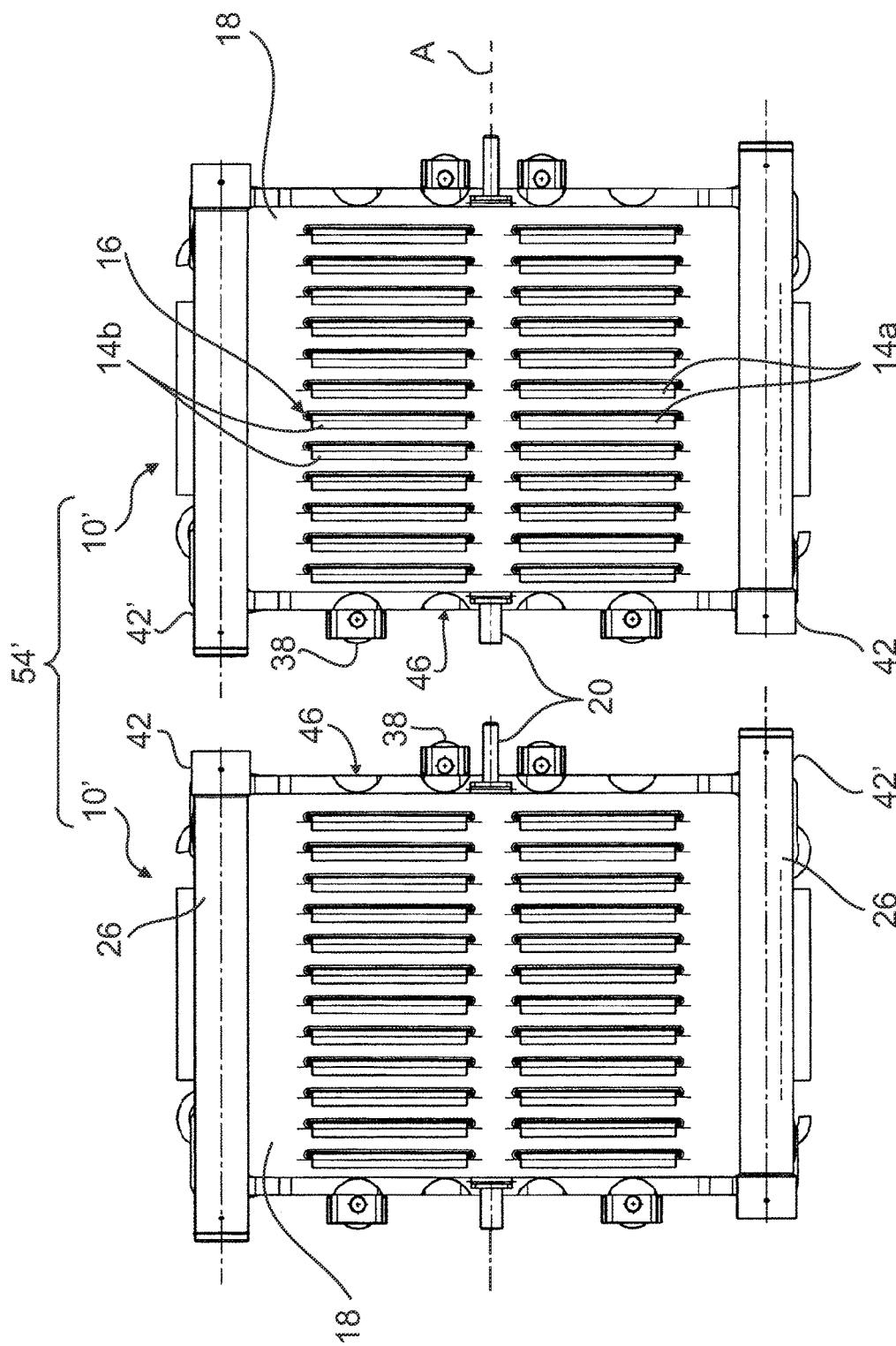
FIG. 13 shows a top view of two energy storage modules according to FIG. 10 in a non-coupled state.

FIG. 13 shows again how the sides facing one another of the energy storage modules 10' are designed in order to form a compact and reliable energy storage unit 54'. The dampening elements 38 of the adjacent energy storage modules 10' are arranged at complementary positions. Moreover, the plugs 20 of the interconnection boards 18 are arranged in the midplane of the two flat-cell stacks 12', which includes the stack axis A. The coolant connectors 42, 42' are also configured in complementary shapes and at complementary positions. In contrast to the situation with the energy storage module 10, the coolant connectors 42' protrude further beyond the cell stack 12' than the coolant connectors 42.

On the basis of the orientation of the electrode tabs 14a, 14b and the slots 16 it can be recognized that the cell stacks 12' of the two energy storage modules 10' are arranged one behind the other. In other words, the two cell stacks 12' have a common stack axis A.

Figure 14:
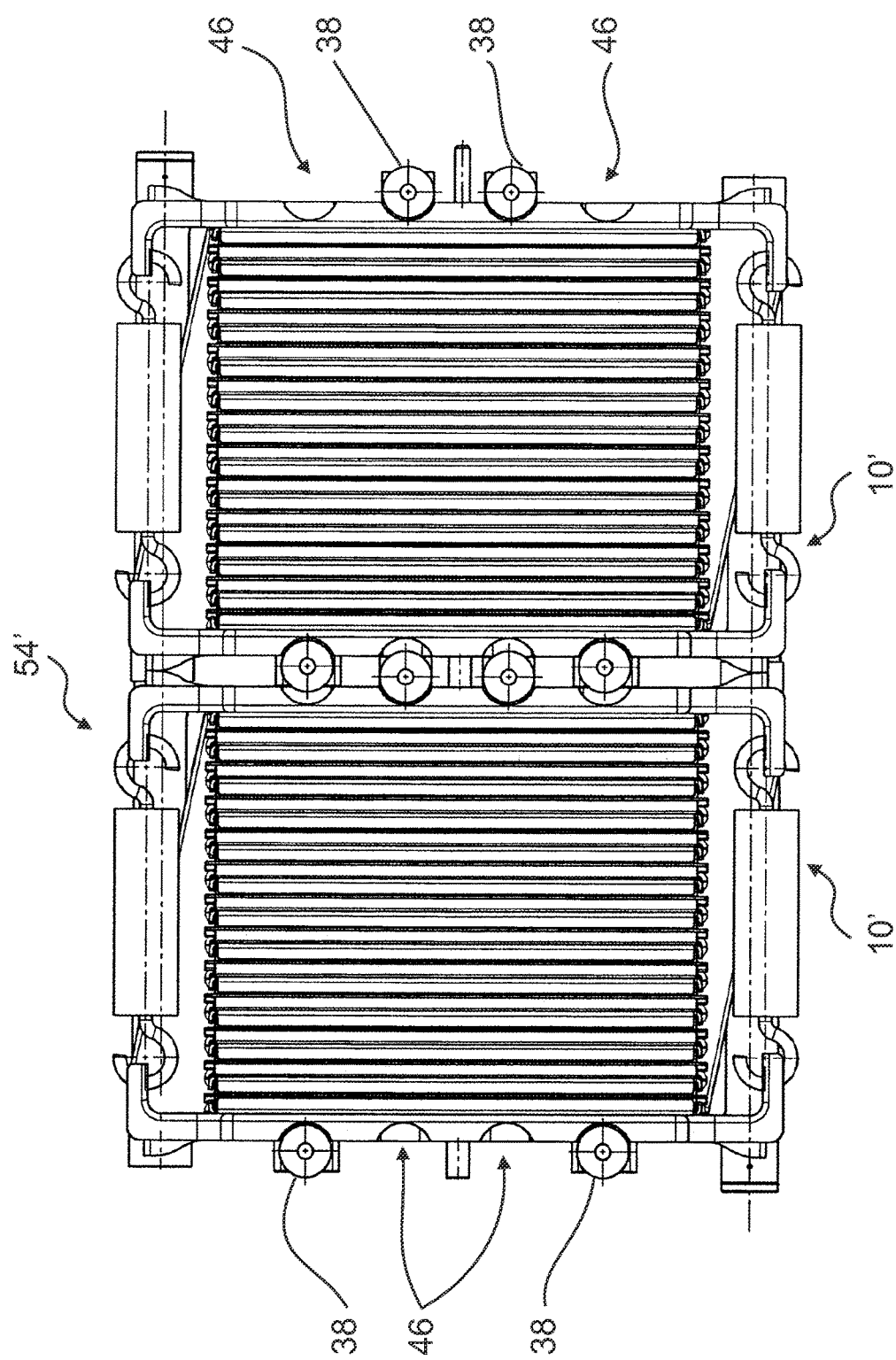
FIG. 14 shows a bottom view of two energy storage modules according to FIG. 10 in a coupled state.

FIG. 14 shows a bottom view of the energy storage unit 54'. The dampening elements 38 of the left energy storage module 10' protrude into the recesses 46 associated with them of the right energy storage module 10' (see also FIG. 13), and vice versa. The tension springs 30 of the adjacent modules 10' are located in a vertical plane which is parallelly displaced from the stack axis A and extends vertically to the image plane.

Figure 15:
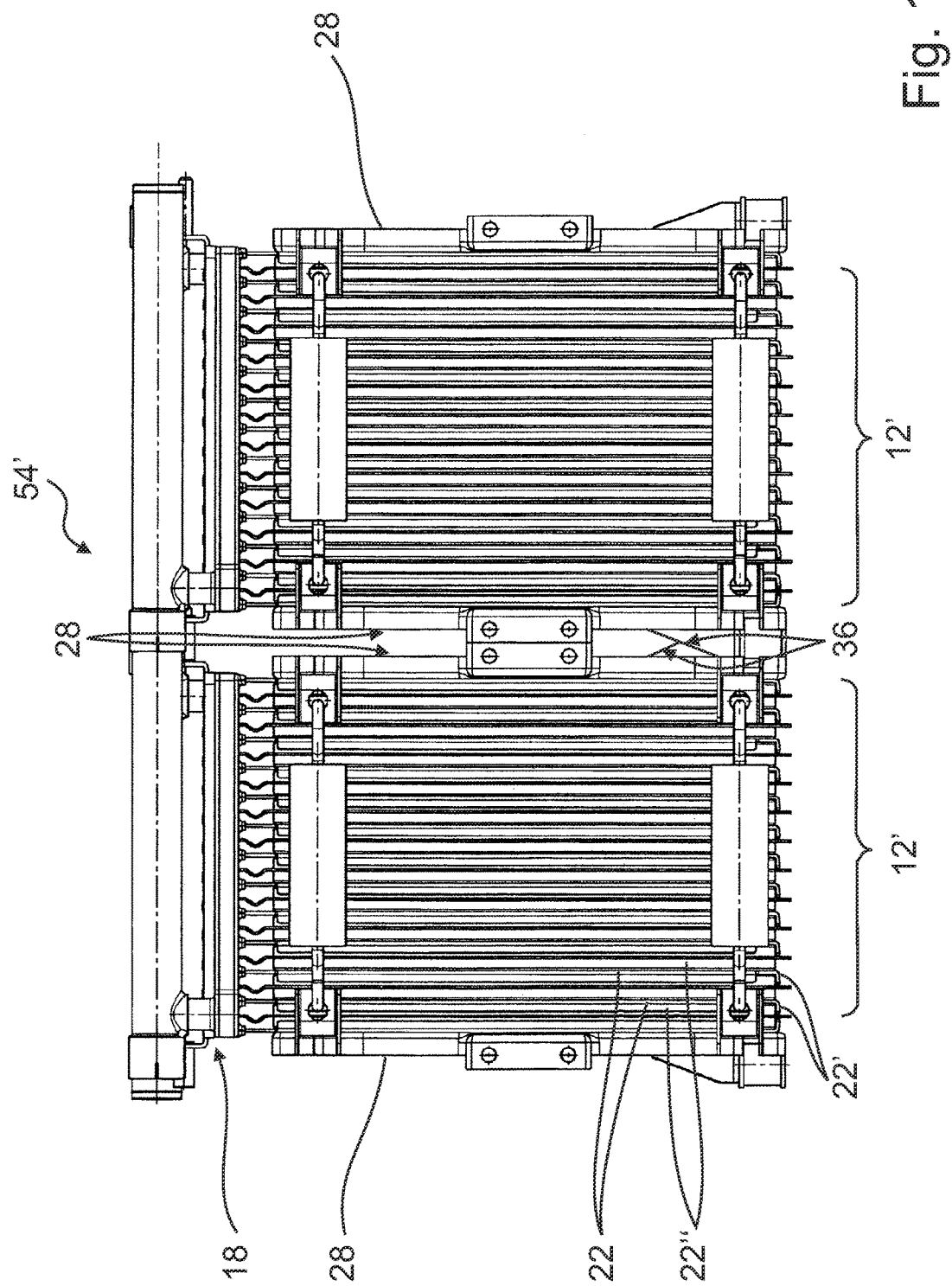
FIG. 15 shows a side view of two energy storage modules according to FIG. 10 in a coupled state.

FIG. 15 shows a side view of the energy storage unit 54', i.e. a view onto one of the side surfaces of the flat-cell stacks 12'. In contrast to the cooling elements 22 of the energy storage module 10, the cooling elements 22 of the energy storage modules 10' do not have any depressions 44'. It is to be understood that depressions can be provided if required. Furthermore, each of the cooling elements 22 has end portions 22' at their lower end facing away from the interconnection board 18, which end portions 22' extend at a right angle to the respective cooling element 22. Due to this fact the flat cells 12 can also be cooled from below. Functionally analogous side portions 22" of the cooling elements 22 laterally encompass parts of the flat cells 12.

Each of the mounting brackets 36 of the adjacent pressure plates 28 abuts on the pressure plate 28 opposite thereto, in order to guarantee a correct distance between the energy storage modules 10' and moreover to impart more stability to the overall arrangement.

Figure 16:
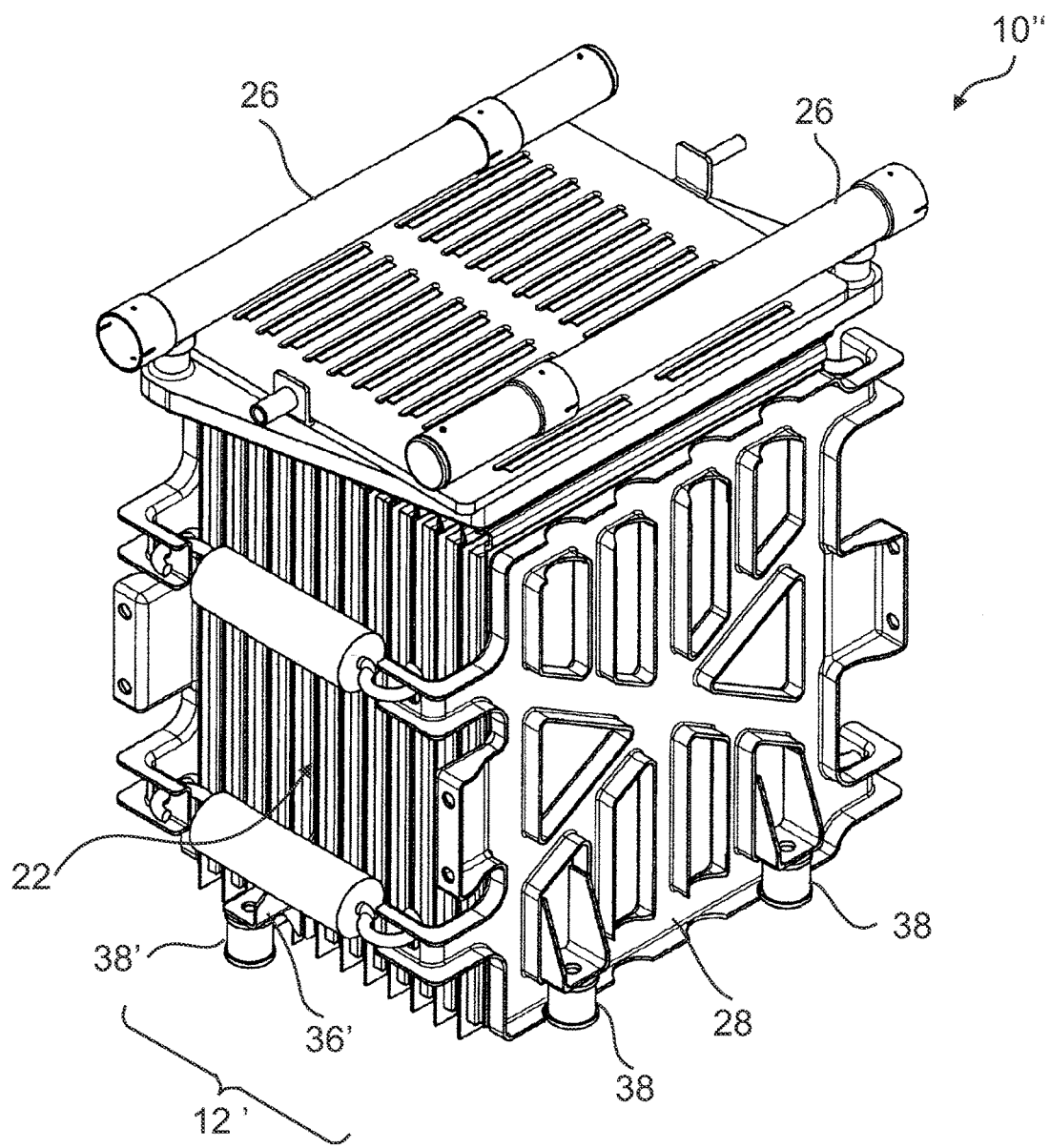
FIG. 16 shows a perspective view of a third embodiment of an energy storage module.

FIG. 16 shows another embodiment 10" of the energy storage module. In the case of the energy storage module 10", the coolant lines 26—as in the case of the energy storage module 10 of FIG. 1—extend in parallel to the flat cells 12 and the cooling elements 22, i.e. perpendicularly to the stack axis A.

However, the energy storage module 10" has, in addition to the dampening elements 38 secured to the pressure plates 28, additional dampening elements 38', which are connected via mounting brackets 36' to individual cooling elements 22. In FIG. 16 it can be seen that such a dampening element 38' is provided at the viewable left side surface of the cell stack 12'. The dampening element 38' serves as a further support point, which is in fact not primarily meant to support a weight of the energy storage module 10" at a support surface. Indeed this additional support point serves to change the natural frequency of the energy storage module 10" in a secured state. In case the energy storage module 10" is, for example, installed in a vehicle, the natural frequency of the module 10" can be changed by means of the mentioned additional support point such that resonance events capable of causing annoying noise or even damage can be reduced. In other words, a characteristic of the coupling between the energy storage module 10" and its environment is changed by means of the additional support point. The coupling is optimized by means of a suitable number and/or configuration of additional dampening elements 38' and their spatial distribution. It can be modified, for example, depending on the configuration and the size of the cell stack 12' and the other components of the energy storage module 10". Herein the frequency characteristic and the configuration of the support surface/mounting surface are relevant, too.

Figure 17:
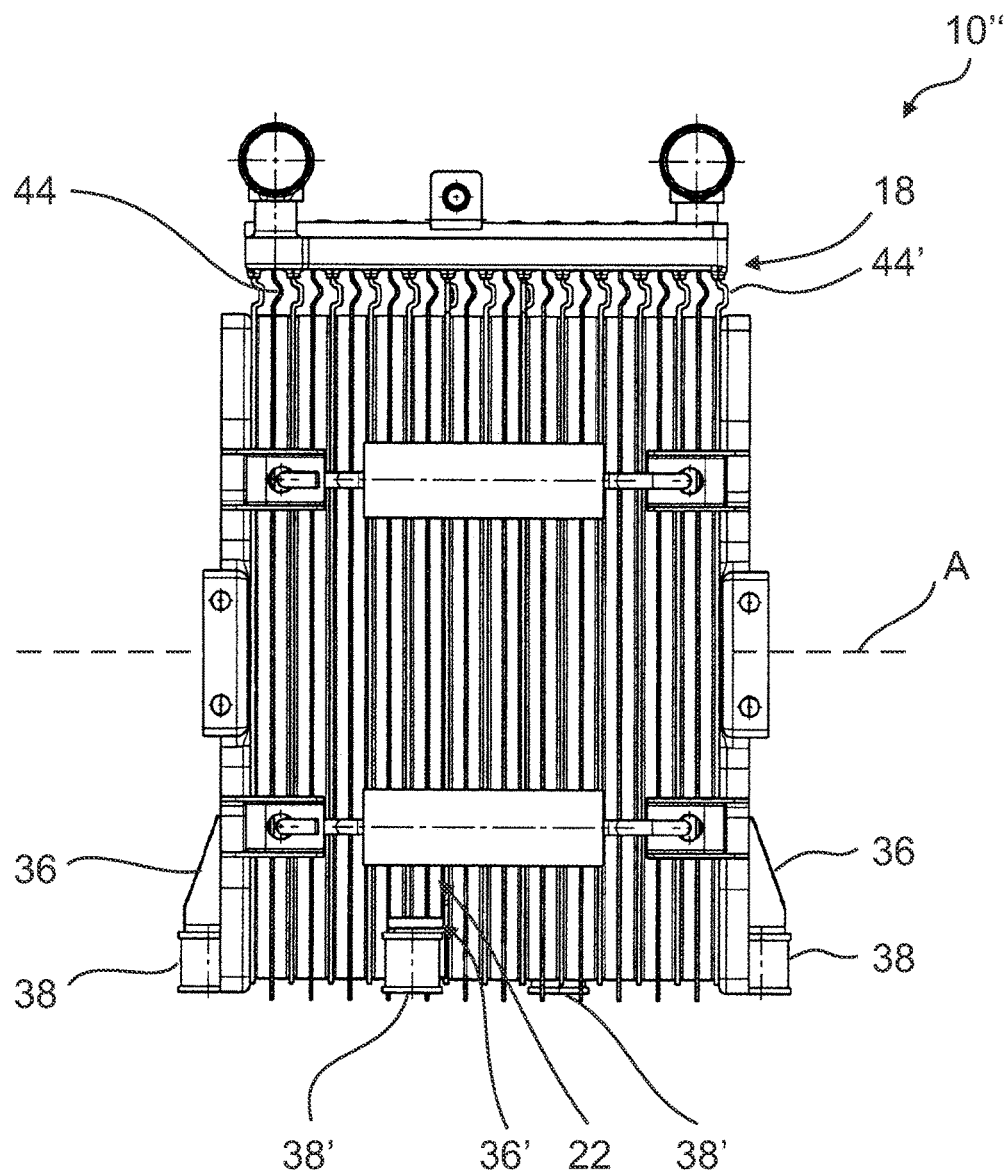
FIG. 17 shows a side view of the energy storage module of FIG. 16.

In the case of the energy storage module 10"—as can be seen in FIG. 17—a dampening element 38' is provided at both side surfaces of the cell stack 12'. The dampening elements 38' are mounted at various cooling elements 22, so that the dampening elements 38' unfold their effect at varying "heights" of the cell stack 12'.

The mounting brackets 36' of the cooling elements 22 laterally protrude from the cell stack 12', so that no corresponding recesses have to be provided in the region of the cell stack 12' for taking up the dampening elements 38'. The cell stack 12' thus essentially corresponds to the cell stacks 12' of the energy storage modules 10, 10'. The mounting brackets 36' with the dampening elements 38' secured thereto thus only form additional "lateral prolongations" of the corresponding cooling elements 22. These prolongations can also be separate components, which are detachably/subsequently connected to certain cooling elements 22, for example, in order to adjust the coupling of the energy storage unit 10 to the support surface.

Like the dampening elements 38, the dampening elements 38', too, are mainly intended to dampen vibrations from below, i.e. to dampen or partially absorb vibrations which are parallel to their longitudinal axis (cylinder axis). This does not exclude that vibrations which are perpendicular thereto are also dampened to a certain extent. The dampening elements 38, 38' are essentially of the same construction. For certain applications, however, differently designed dampening elements 38, 38' can be provided, in particular concerning their dimensions and resilient properties.

FIG. 17 shows a side view of the energy storage module 10", enabling to see, at least to some extent, the dampening element 38' at the rearward side surface of the cell stack 12', which cannot be seen in FIG. 16. In the case of the energy storage module 10", the cooling elements 22 as well as the electrode tabs 14a, 14b are provided with depressions 44' and 44, respectively, for compensating in particular vertical distance alterations between the interconnection board 18 and the cell stack 12'.

It is to be understood that various aspects and details which have been described merely on the basis of one of the embodiments 10, 10', 10" of the energy storage module and on the basis of one of the embodiments 54, 54' of the energy storage unit, respectively, can be randomly combined with the respective other embodiments in order to create a product adapted to the requirements present in each individual case.

The modular design of the energy storage modules 10, 10', 10" enables a fast and inexpensive adaptation of an energy storage unit to the requirements present in each case. It is achieved, on the one hand, by the design of the external shape of the modules 10, 10', 10" and, on the other hand, by the unitized/complementary position of the connectors 20, 42, 42', 40 and by their configuration in complementary shapes.

The invention claimed is:

1. An energy storage module comprising:
a plurality of flat cells arranged in a flat-cell stack;
a plurality of resilient elements; and
a plurality of pressure plates, each of the pressure plates comprising a plurality of attachment brackets, ones of the attachment brackets protruding from an edge of the pressure plate in a first direction and others of the attachment brackets protruding from an opposite edge of the pressure plate in a second direction opposite to the first direction, the pressure plates being arranged at opposing ends of the flat-cell stack and being connected to each other via the resilient elements respectively connected to the attachment brackets such that the pressure plates exert pressure on the flat-cell stack,
wherein the ones of the attachment brackets protruding from the edge and the ones of the attachment brackets protruding from the opposite edge are alternately arranged at different heights along the pressure plate in a third direction, the third direction being perpendicular to the first and second directions.

2. The energy storage module of claim 1, wherein each of the pressure plates comprises a plurality of attachment flanges protruding from the edge and the opposite edge of the pressure plate, the attachment flanges being configured to be connected to other attachment flanges of an other energy storage module.

3. The energy storage module of claim 2, wherein one of the attachment flanges and one of the attachment brackets protruding from the edge form a first space configured to accommodate an attachment bracket of the other energy storage module when the attachment flange is connected to the other attachment flange.

4. The energy storage module of claim 3, wherein the first space is arranged at the height of the attachment bracket protruding from the opposite edge.

5. The energy storage module of claim 2, wherein the resilient elements connected to the attachment brackets protruding from the edge are spaced from each other to form a second space configured to receive an other resilient element of the other energy storage module when the attachment flange is connected to the other attachment flange.

6. The energy storage module of claim 1, wherein a portion of each of the attachment brackets extends parallel to a stacking direction of the flat-cell stack.

7. The energy storage module of claim 1, further comprising a cooling system through which a coolant passes, the cooling system comprising a plurality of connectors configured to be connected to a cooling system of an other energy storage module.

8. The energy storage module of claim 1, further comprising an interconnection board comprising a plurality of slots, each of the slots being configured to receive an electrode tab of one of the flat cells.

9. The energy storage module of claim 8, wherein the interconnection board is arranged above the flat-cell stack in the third direction.

10. The energy storage module of claim 9, wherein each of the flat cells comprises a depressed portion, the depressed portion being beneath the interconnection board and above the pressure plates in the third direction.

11. The energy storage module of claim 1, further comprising a resilient plate coupled to the pressure plates,
wherein the resilient plate is arranged at a height different from the heights of the attachment brackets protruding from the edge in the third direction.

* * * * *